June 5, 1962

C. HADDAD 3,037,788

MOTOR VEHICLE AIR SUSPENSION SYSTEM

Filed Nov. 12, 1957

C. HADDAD
INVENTOR.

BY E. C. McRae
J. R. Faulkner
T. H. Oster

ATTORNEYS

June 5, 1962 C. HADDAD 3,037,788
MOTOR VEHICLE AIR SUSPENSION SYSTEM
Filed Nov. 12, 1957 3 Sheets-Sheet 2

C. HADDAD
INVENTOR.

BY E.C. McRae
J. R. Faulkner
G. H. Oster

ATTORNEYS

June 5, 1962   C. HADDAD   3,037,788
MOTOR VEHICLE AIR SUSPENSION SYSTEM
Filed Nov. 12, 1957   3 Sheets-Sheet 3

C. HADDAD
INVENTOR.

BY *C.C. McRae*
*J.R. Faulkner*
*D.H. Oster*

ATTORNEYS

United States Patent Office 3,037,788
Patented June 5, 1962

3,037,788
MOTOR VEHICLE AIR SUSPENSION SYSTEM
Charles Haddad, Detroit, Mich., assignor to Ford Motor Company, Dearborn, Mich., a corporation of Delaware
Filed Nov. 12, 1957, Ser. No. 695,715
3 Claims. (Cl. 280—124)

This invention relates generally to an air suspension system for a motor vehicle, and particularly to the leveling mechanism for the system.

An object of the invention is to provide an air suspension system for a motor vehicle incorporating leveling mechanism automatically maintaining a predetermined relationship between the vehicle chassis and the road wheels regardless of the load on the vehicle. A further object is to provide, in a system of this type, valve mechanism which locks the air in the air spring in the event of a drop in the air pressure in the supply line from the air compressor. This constitutes a safety feature in that the air in the air spring will be maintained even though a leak develops in another part of the system.

In an embodiment of the present invention, a valve is provided between the leveling valve and the air spring, and has opposed parts subjected to the air pressure from the source and from the air spring. In normal operation, the pressure from the source acting on the valve holds the valve open so that normal filling and exhausting may take place in response to the relative positions of the chassis and wheel. In the event the pressure from the source drops sufficiently, the pressure in the air spring will urge the valve in the opposite direction to a closed position so that the air in the air spring will be trapped, thus preventing the spring from being exhausted under such conditions. Dependent upon the relative valve areas exposed to the air pressures in the source and air spring, the valve may be arranged so that it closes whenever the line pressure from the source drops below the spring pressure, or the valve may be arranged to close whenever the line pressure from the source attains a predetermined value with respect to the spring pressure either above or below the spring pressure value.

In another embodiment of the invention, the system may incorporate means to exhaust the supply line whenever the vehicle ignition is turned off, or whenever the vehicle ignition is turned off and all vehicle doors are closed, so that the valve between the leveling valve and the air spring will be closed to lock the air in the spring.

Other objects and advantages of this invention will become more apparent as the description proceeds, particularly when considered in connection with the accompanying drawings in which:

FIGURE 1A is a fragmentary side elevational view of motor vehicle chassis incorporating the present invention;

Figure 1:
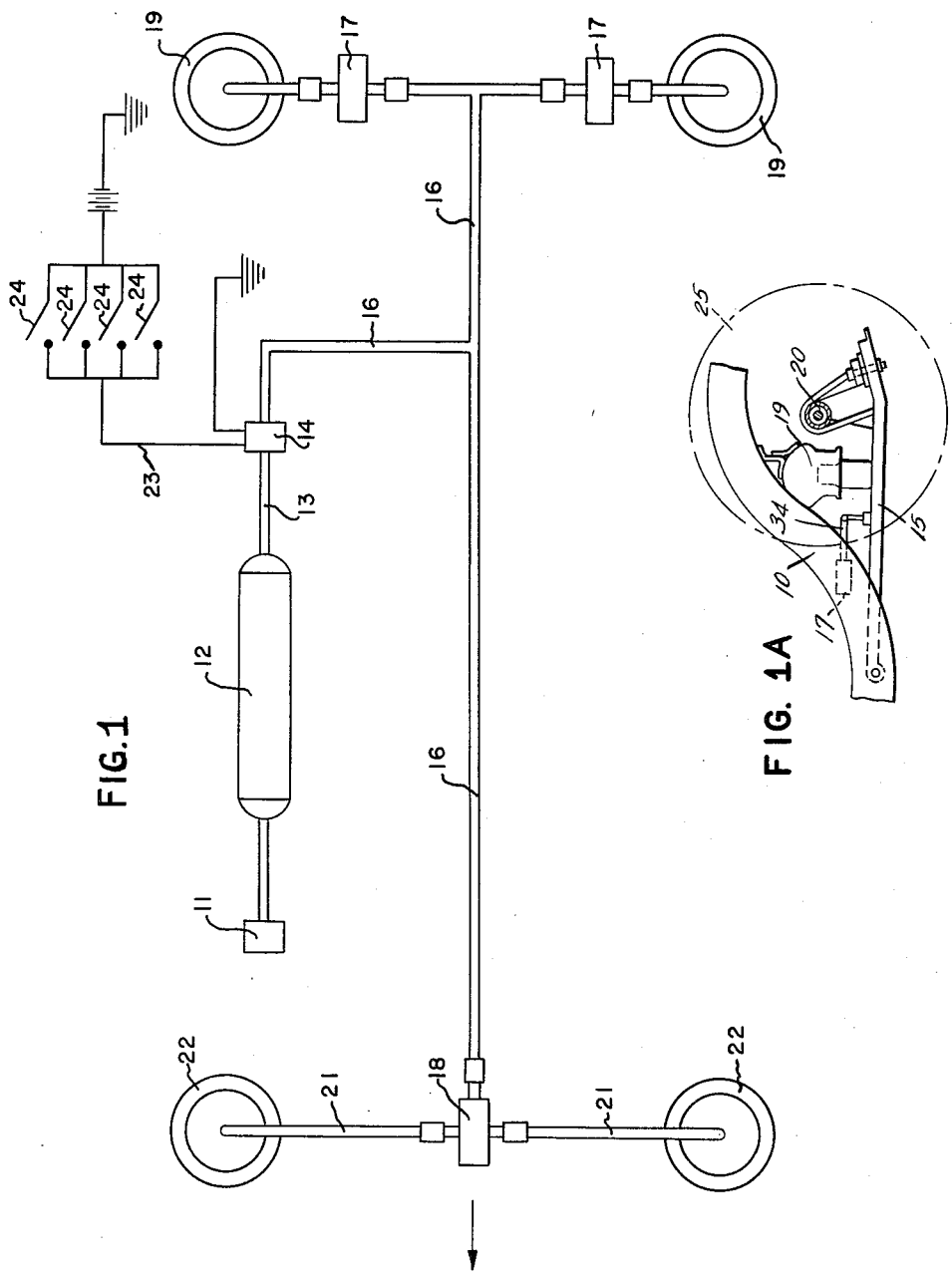
FIGURE 1 is a diagrammatic view of an air suspension system incorporating the present invention.

Referring now to the drawings, and particularly to FIGURES 1 and 1A, the reference character 11 indicates generally an air compressor adapted to charge an air storage tank 12. The storage tank 12 is connected by a conduit 13 to a solenoid operated valve 14 which in turn is connected by means of a conduit 16 to a pair of rear leveling valves 17 and a centrally located front leveling valve 18. The rear leveling valves 17 control the supply of air to, and the exhausting of air from, rear air springs 19 conventionally mounted between the vehicle frame and rear suspension members (not shown). The front leveling valve 18 is connected by conduits 21 to a pair of front air springs 22 conventionally mounted between the vehicle frame and lower front suspension members (not shown).

Figure 2:
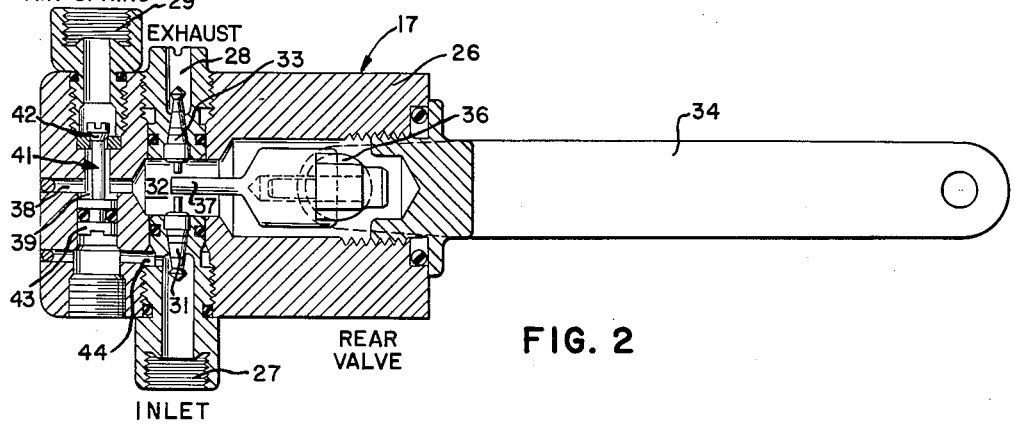
FIGURE 2 is an enlarged cross sectional view of the rear leveling valve of the system shown in FIGURE 1.
Figure 3:
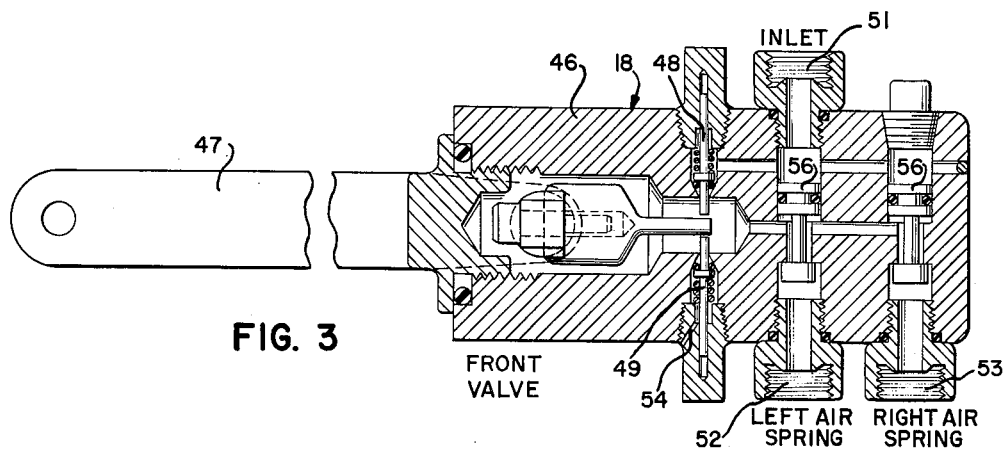
FIGURE 3 is an enlarged cross sectional view of the front leveling valve of the system shown in FIGURE 1.

When applied to the leveling valves shown in FIGURES 2 and 3, the solenoid operated valve 14 of the system shown in FIGURE 1 comprises a shutoff valve which may be opened or closed, depending upon the condition of the vehicle doors. This particular control system is shown only for purposes of illustration, since the invention is applicable to other types of leveling control as well. The energization of the solenoid 14 is controlled by means of a circuit 23 incorporating a plurality of switches 24 in parallel. Each switch 24 may be associated with a vehicle door and, if desired, may be the existing courtesy light switch which normally functions to turn on a light when the door is opened. It will be seen that whenever any door is opened, one of the switches 24 will be closed to energize the solenoid and open the solenoid controlled valve 14 to supply air pressure from the storage tank 12 to the conduit 16 leading to the various leveling valves. When all doors are closed, on the other hand, all switches 24 are open and the valve 14 is closed so that no air will be supplied to the leveling valves.

Referring now to the rear leveling valve 17 shown in FIGURE 2, it will be seen that the valve comprises a housing 26 having an inlet port 27 adapted to be connected to the supply conduit 16, an exhaust port 28 connected to atmosphere, and a port 29 connected to the adjacent air spring 19.

The valve housing 26 is provided with an inlet valve 31 controlling communication between the inlet port 27 and a central chamber 32, and an exhaust valve 33 controlling communication between the central chamber 32 and the exhaust port 28. These valves are normally held in closed position, but may be opened by an arm 34 which is pivotally mounted upon the valve body at 36, and which has an extension 37 projecting into the valve chamber 32 between the stems of the inlet and outlet valves 31 and 33 respectively. The valve housing 26 is conventionally mounted upon the vehicle frame 10, and the arm 34 is connected to a rear suspension member 15 so that the relative movement between the frame and road wheel results in movement of the arm 34 to open one of the valves 31 and 33. The rear suspension member 15 carries the rear axle 20 which conventionally supports road wheels 25. The air spring 19 is mounted between the suspension member 15 and the frame member 10.

The valve chamber 32 communicates through a passage 38 with a valve bore 39 formed in the valve housing. A shutoff valve 41 is reciprocably mounted within the bore 39, and has an end portion 42 adapted to close the passage formed by the valve bore to cut off communication between the valve chamber 32 and the port 29 to the air spring. The opposite end of the valve 41 is formed with an enlarged head 43 exposed to the pressure at the inlet port 27 by means of a cross passage 44.

During normal operation of the leveling system, the air pressure supplied to the inlet 27 of the leveling valve from the pressure tank 12 is greater than the pressure within the rear air spring 19. This line pressure is transmitted from the inlet 27 through the cross passage 44 to the head 43 of the air spring shutoff valve 41 and the valve will be moved to an open position freely establishing communication between the air spring 19 and the central valve chamber 32. During this time, the pressure of the air spring will be exerted upon the upper face of the head 43 of the valve 41, but since it is less than the supply line pressure, the valve will remain open.

With the valve 44 thus open, normal leveling may take place, dependent upon the relative position between the vehicle frame and road wheel. If the vehicle is too high, the leveling valve will open the exhaust valve 33 and permit air to flow from the air spring to exhaust, while if the vehicle is too low, the inlet valve 31 will be opened permitting supply line air to flow to the air spring.

Should a leak develop in the supply line 16, the storage tank 12, or in any other associated part of the system, the air spring valve 41 will automatically be closed. This results from the fact that a drop in the supply line pressure below that in the air spring will cause the air spring pressure acting upon the upper face of the valve head 43 to move the valve to a closed position, trapping the air in the spring and preventing it from being exhausted. A safety feature is thus provided.

Reference is now made to FIGURE 3 for a description of the front leveling valve 18. This valve differs from the rear leveling valve in that it controls both front air springs 22. The housing 46 of the front leveling valve 18 is mounted upon the vehicle frame, while the control arm 47 is suitably connected to a front suspension arm. Rocking movement of the arm 47 is effective to engage the stem of either the inlet valve 48 or the exhaust valve 49 to control the flow of air to and from the front air springs. The supply line 16 is connected to the inlet port 51 while the conduits 21 to the left and right front air springs 22 are connected to ports 52 and 53 respectively. Exhaust valve 49 is connected by a port 54 to the atmosphere.

A pair of identical air spring shutoff valves 56 are provided, one for each front air spring. The upper face of the head of each valve 56 is subjected to the supply line pressure furnished to the inlet port 51, while the lower face of each valve head is subjected to the pressure of the respective front air spring. The valves thus operate in a manner similar to that described in more detail with respect to the rear leveling valve shown in FIGURE 2 in that they are normally held open by reason of the fact that the supply line pressure exceeds the air spring pressure. In the event of leakage or other failure in the system, followed by a drop in the supply line pressure, then valves 56 will automatically be closed by the overriding air spring pressure to isolate each front air spring, not only from the system but also from each other, and to lock the air in the respective air springs.

Figure 4:
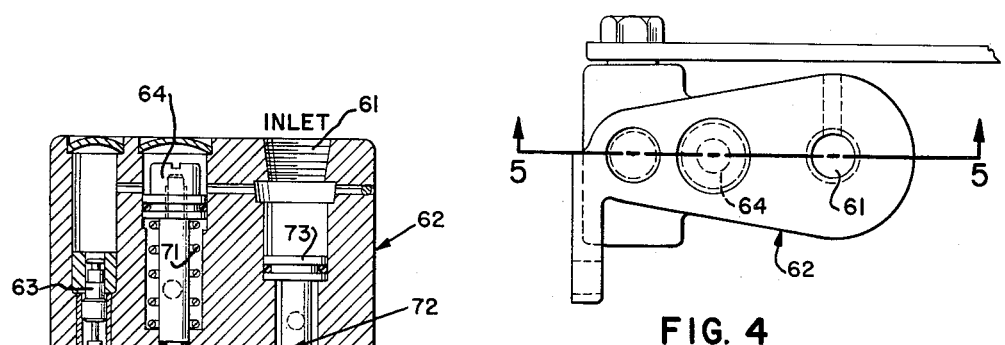
FIGURE 4 is a top plan view of a modified leveling valve incorporating the present invention.
Figure 5:
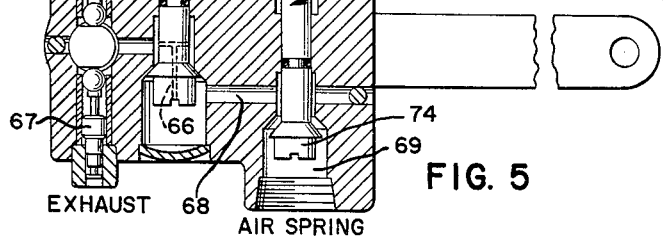
FIGURE 5 is a cross sectional view taken on the line 5—5 of FIGURE 4.

FIGURES 4 and 5 illustrate a modified leveling valve incorporating the present invention in a system of the type shown in my copending application Serial No. 652,554, filed April 12, 1957. In this system, the solenoid valve 14 constitutes a regulator valve arranged to supply air at two different pressures to the supply conduit 16, and hence to the inlet 61 of the leveling valve 62. This regulated pressure is supplied to a conventional inlet valve 63, and also to the head of a control valve 64 arranged, as discussed more in detail in the copending application, to provide air flow between the leveling valve and the air spring at two different rates. The control valve 64 has a small passage 66 providing air flow at a slow rate between the inlet valve 63 and the exhaust valve 67 on the one hand, and a passage 68 connected to the air spring outlet 69 on the other hand. Thus, when the lower of the two regulated pressures is supplied to the leveling valve 62, the control valve 64 is closed except for the small passage 66, and a slow air flow results. When a vehicle door is opened and the solenoid regulator valve 14 supplies air to the leveling valve inlet 61 at a higher pressure, the higher pressure overcomes the spring 71 of the control valve 64 and opens the valve to provide air flow at a faster rate for quick leveling.

An air spring lock-out valve 72 is provided in series with the inlet and outlet valves 63 and 67 and the control valve 64. The head 73 of the lock-out valve is subjected to the pressure from the inlet port 61, while the lower end 74 of the valve is subjected to the pressure in the air spring. Normally, the supply line pressure is sufficient to move the lock-out valve 72 to the open position as shown so that normal filling and exhausting may take place. In the event the supply line pressure drops sufficiently, the air spring pressure will move the valve upwardly to close the valve 72 and lock the entrapped air in the air spring. As with the other modifications, this constitutes a safety feature guarding against leaks and the like.

It will be noted in connection with the leveling valve 62 of FIGURE 5, that the area of the valve head 73 of the valve 72 is greater than the effective area at the opposite end of the valve. With this arrangement, the movement of the valve to open position under the pressure of the supply line is insured even though there may be a certain amount of friction between the valve and the valve bore. It will also be seen that by making the relative effective areas of the valve which are subjected respectively to the source pressure and the air spring pressure different in area, the relative drop in pressure in the supply line necessary to effect a closing of the lock-out valve may be varied. The valve areas might be arranged, for example, so that the lock-out valve will close when the supply line pressure is somewhat higher, the same, or somewhat lower, than the air spring pressure.

Figure 6:
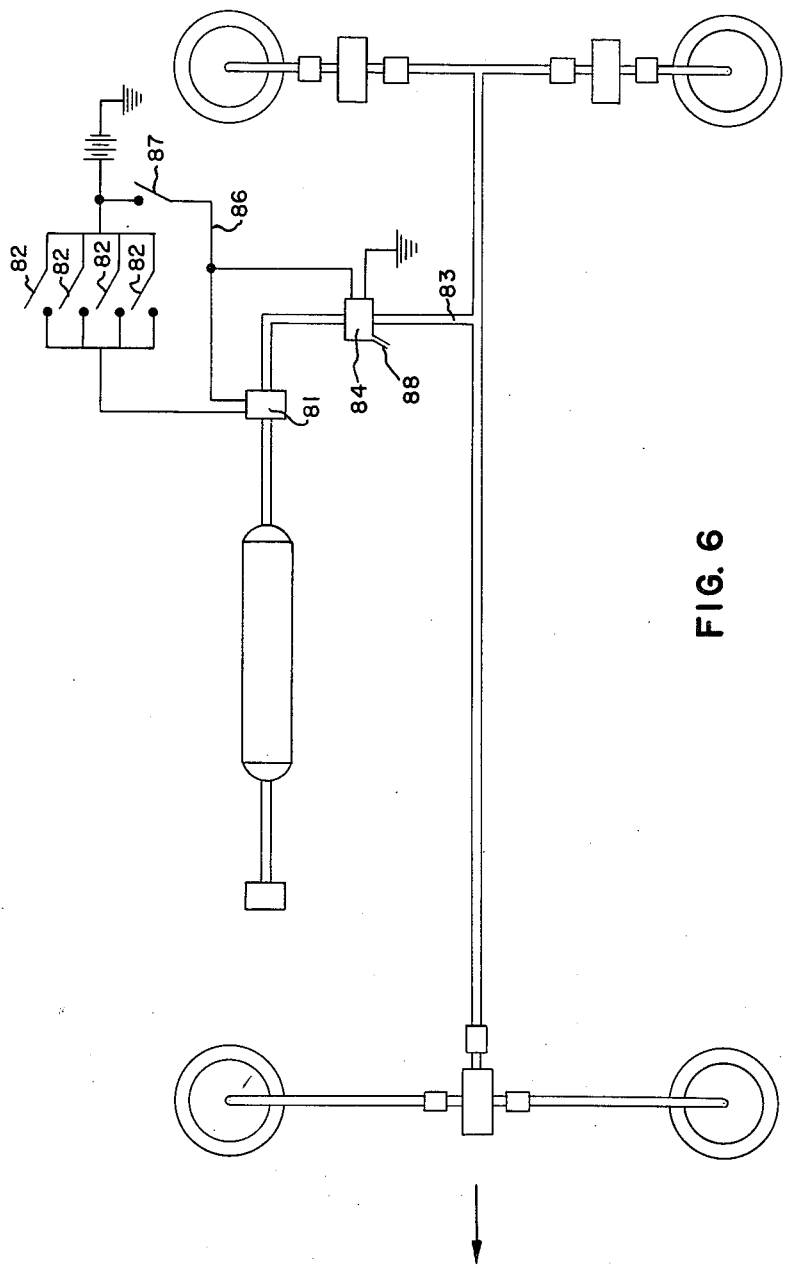
FIGURE 6 is a diagrammatic view of a modified system.

Reference is now made to the diagrammatic view shown in FIGURE 6 which illustrates a further modification. This system comprises a three position system, and may be utilized in connection with the leveling valve shown in FIGURES 4 and 5. It incorporates a solenoid operated regulator valve 81 controlled by door switches 82 to provide pressure to the supply line 83 at two different pressure values to operate the slow-fast control valve 64 in the manner described in connection with FIGURE 5. The system also incorporates a valve 84 in the supply line 83 which is connected in a circuit 86 with the vehicle ignition switch 87.

The operation of this modified system is as follows:

Whenever the ignition switch 87 is open and the vehicle doors are closed, both the regulator valve 81 and the valve 84 will be de-energized. When de-energized, the valve 84 opens the supply line 83 to an exhaust port 88 to exhaust the supply line 83. This drop in pressure automatically enables the pressure in each air spring to close the air spring lockout valve 72 of FIGURE 5 of the respective leveling valve. When the ignition is closed, the valve 84 is energized and is opened to establish communication between the regulator valve 81 and the leveling valves. Under these circumstances, air is supplied to the levling valves at either the higher or lower pressure, dependent upon whether a vehicle door is open or all vehicle doors closed respectively.

This modified system locks the air in all air springs whenever the vehicle doors are closed and the ignition switch off, so that no leveling takes place under these conditions and so that no air can leak from the air springs. Even with the ignition off, however, leveling may take place when a vehicle door is opened, since the solenoid valve 84 will be energized through the switch 82 to open the supply conduit 83. When all vehicle doors are closed as, for example, when the vehicle is in operation, the solenoid valve 84 will be opened since under these conditions the ignition switch will be closed, and leveling can take place at the slow air flow rate provided by the control valve 64.

It will thus be seen that this modified system is extremely flexible to provide for leveling at slow and fast rates, and yet incorporates means to isolate each air spring and to minimize the possibility of loss of air from the air springs due to leakage in other parts of the system.

It will be understood that the invention is not to be limited to the exact construction shown and described, but that various changes and modifications may be made without departing from the spirit and scope of the invention, as defined in the appended claims.

What is claimed is:

1. In a motor vehicle having a sprung member and an unsprung member, an air spring resiliently connecting said members, a source of air pressure for said air spring, leveling valve means responsive to variations in the relationship between said sprung and unsprung members to control the flow of air from said air source to said air spring and from said air spring to exhaust, control valve means in series with said leveling valve means to vary the rate of air flow to and from said air spring, actuating means for controlling said control valve means responsive to the pressure of said air source, and a third valve means in series with said leveling valve means and said control valve means, said third valve means being subjected to the air pressure of said air source to hold said valve open at normal operating pressures and to close said valve when the pressure from said source is decreased a predetermined amount.

2. In a motor vehicle having a chassis member resiliently supported upon a wheel member by means of an air spring, and a source of air under pressure for said air spring, leveling control mechanism mounted upon one of said members, actuating means for said leveling control mechanism operatively connected to the other of said members to be responsive to variations in the relationship between said chassis member and said wheel member to maintain a predetermined relationship therebetween, a flow rate valve between said leveling control mechanism and said air spring to vary the rate of air flow to and from said air spring, said flow rate valve being responsive in its control to the air pressure of said source, and a shut-off valve in series with said flow rate valve, and shut-off valve having a part thereof subjected to the air pressure in said air spring and an opposed part thereof subjected to the air pressure of said source, said shut-off valve being opened or closed in response to the relative pressures of said air spring and said source.

3. In a motor vehicle having a sprung member and an unsprung member, a resilient air spring mounted between said members, a source of air pressure for said air spring, leveling valve means responsive to variations in the relationship between said sprung and unsprung members to control the flow of air from said air source to said air spring and from said air spring to exhaust, a flow rate valve in series with said leveling valve to vary the rate of air flow between said air source and said air spring, said flow rate valve being responsive in its control to the air pressure of said source, control valve means in series with said leveling valve means and said flow rate valve to control the flow of air to and from said air spring, said control valve means being exposed to the air pressures in said air spring and said air source to be opened or closed in response to the relative pressure differential therebetween.

References Cited in the file of this patent
UNITED STATES PATENTS

| | | |
|---|---|---|
| 509,992 | Wood | Dec. 5, 1893 |
| 1,065,220 | Clay | June 17, 1913 |
| 1,555,199 | Gouirand | Sept. 29, 1925 |
| 2,692,581 | Ziebolz | Oct. 26, 1954 |
| 2,787,475 | Jackson | Apr. 2, 1957 |

FOREIGN PATENTS

| | | |
|---|---|---|
| 3,974 | Great Britain | Feb. 25, 1905 |
| 20,114 | Great Britain | Oct. 5, 1905 |